July 12, 1927. 1,635,826
W. J. ENGLE
AGRICULTURAL IMPLEMENT
Filed Feb. 5, 1923  3 Sheets-Sheet 1
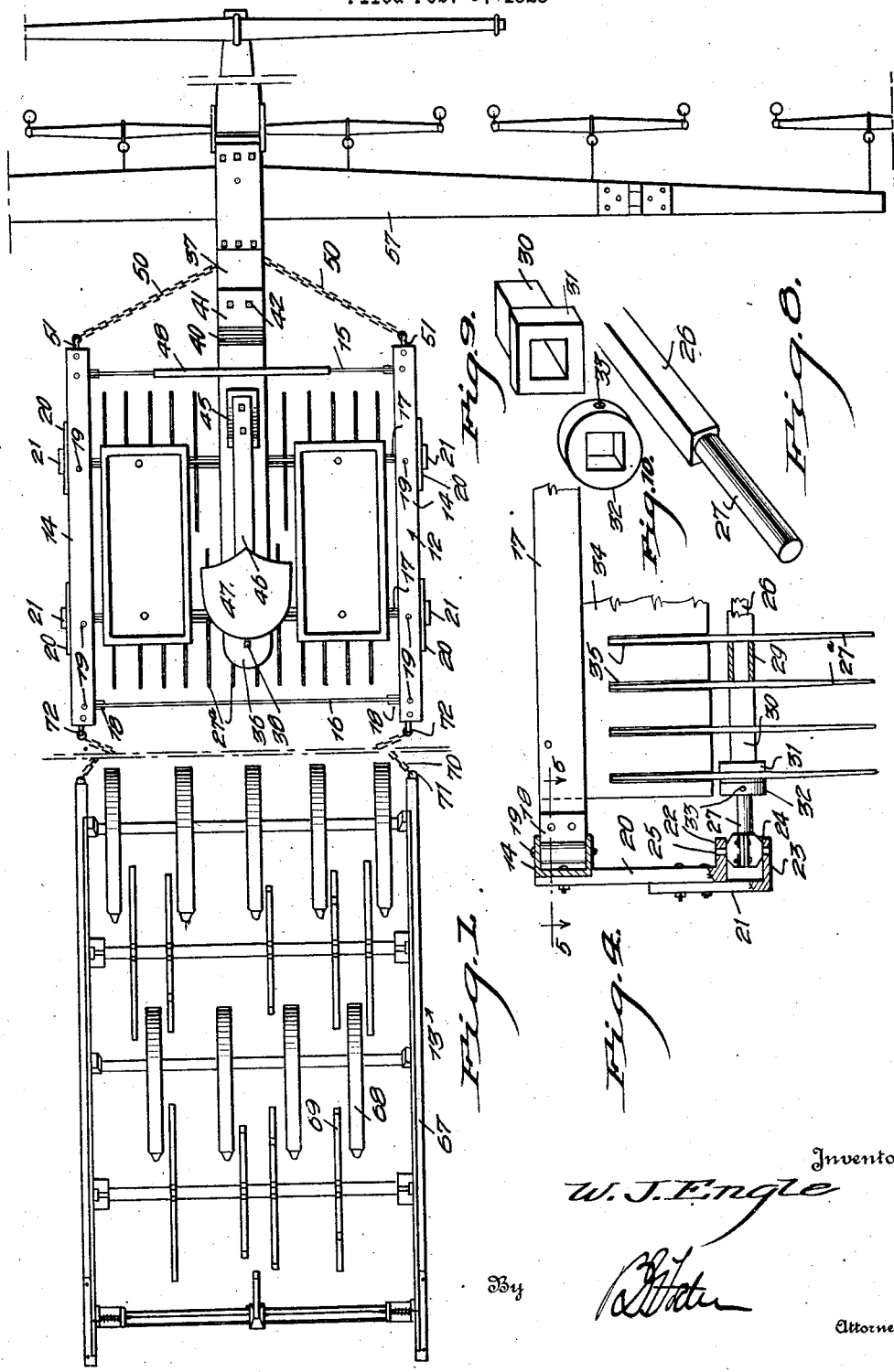
Inventor
W. J. Engle
By
Attorney

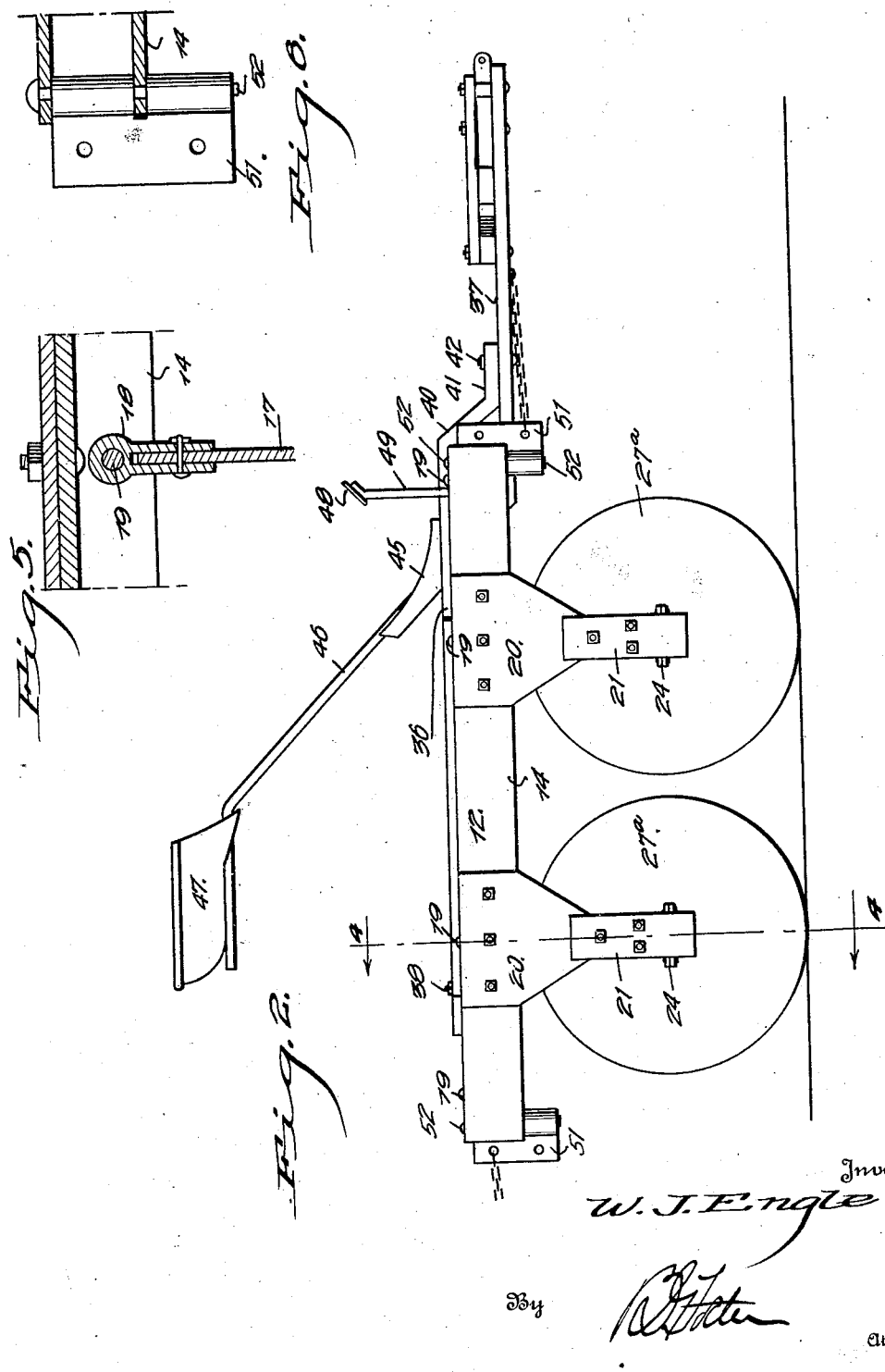

July 12, 1927.
W. J. ENGLE
1,635,826
AGRICULTURAL IMPLEMENT
Filed Feb. 5, 1923
3 Sheets-Sheet 3
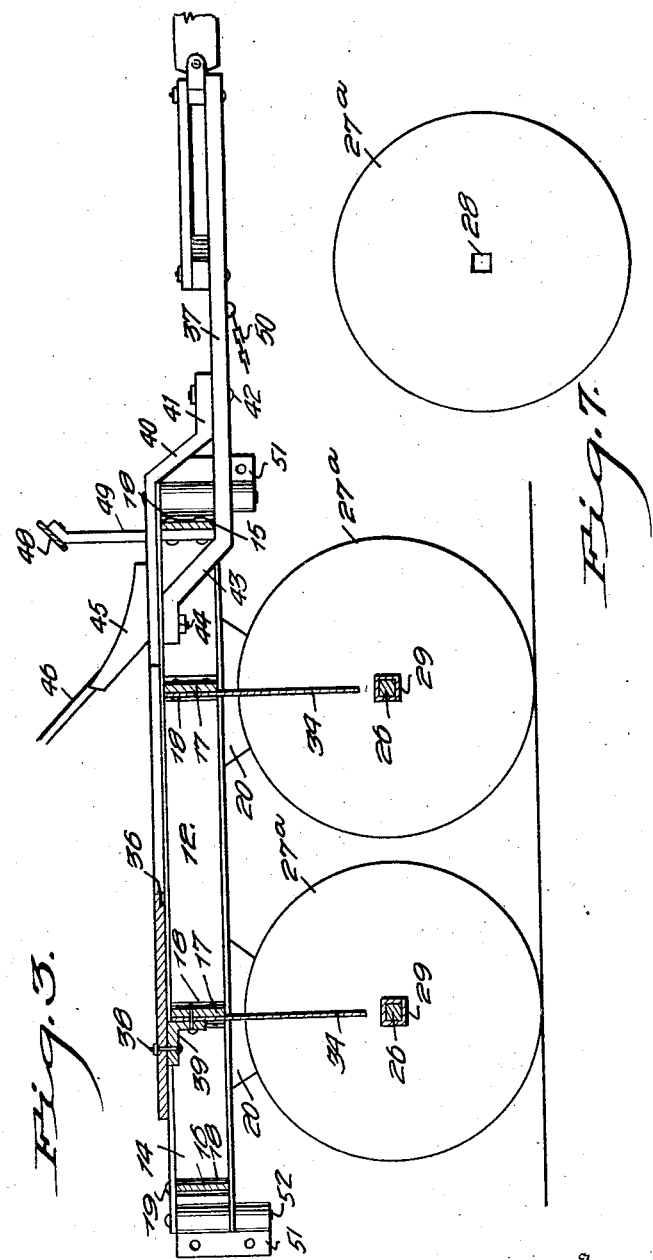

Patented July 12, 1927.

1,635,826

UNITED STATES PATENT OFFICE.

WASHINGTON J. ENGLE, OF URBANA, ILLINOIS.

AGRICULTURAL IMPLEMENT.

Application filed February 5, 1923. Serial No. 617,122.

The present invention relates to an agricultural implement or tool which will disk and smooth the ground, may be drawn either by draft animals or tractor, will accommodate itself to unevenness, will make turns without creating abnormal strain upon the animals or parts of the tool, and will effectively do the work of a number of implements ordinarily employed separately, thereby materially reducing the cost of preparing the ground.

In the accompanying drawings:—

Figure 1 is a plan view of the preferred embodiment of the invention,

Figure 2 is a side elevation of the disking tool,

Figure 3 is a longitudinal sectional view therethrough,

Figure 4 is a detail cross sectional view on the line 4—4 of Figure 2,

Figure 5 is a detail sectional view on the line 5—5 of Figure 4,

Figure 6 is a detail sectional view of the front end of one of the side members, Figure 7 is a view in elevation of one of the disks, Figure 8 is a detail perspective view of an end portion of one of the cross shafts, Figure 9 is a detail perspective view of one of the spacing thimbles, Figure 10 is a detail perspective view of the clamping washer.

In the embodiment disclosed in Figure 1, two tools are employed designated, respectively, 12 and 13, the tool 12 operating in advance of the tool 13, but all moved from a single operating source, such as draft animals or a tractor.

Referring first to the tool 12, a frame is provided, comprising side members 14, preferably of channel iron, these side frames being connected by front and rear cross struts 15 and 16 and intermediate cross struts, two of which are shown at 17. These struts are all provided with terminal ears 18 located in the channels of the side members 14 and connected thereto by vertical pintles 19 passing through said ears and secured in the side members. A flexible frame is thus provided.

Depending from the side members 14 are brackets, comprising upper sections 20 and lower sections 21. The upper sections are bolted, or otherwise secured, to the side members 14 and have inturned ears 22. The lower sections 21 are secured to the outer sides of the upper sections 20, and have inturned ears 23 underlying the ears 22. Boxes 24 are interposed between the ears 22 and 23, and have pivotal bearings 25 in said ears. Cross shafts are provided, having body portions 26 that are angular in cross section, with cylindrical gudgeons 27 that are journaled in the boxes 24, and on the angular portions 26 of said cross axles are mounted disks 27$^a$ having angular openings 28 through their centers to receive the shafts. The disks are spaced apart by thimbles 29 on said shaft 26 between the said disks. The end disks are spaced from their neighbors by thimbles 30 having flanges 31 that bear against the inner sides of said end disks. Collars 32 are located on the shafts 26 on the outer side of the end disks, and are secured in place by set screws 33. The brackets 20—21 are so located that the shafts 27 are directly beneath the intermediate cross struts 17, and said cross struts carry cleaners for the disks. These cleaners are preferably in the form of plates 34 that depend from the struts 17 and are slotted, as shown at 35, to receive the disks.

For the purpose of moving the tool a draft member is employed, in the form of a tongue. This tongue is made up of sections 36 and 37. The section 36 overlies the front strut 15 and the two intermediate struts 17, and has a pivotal connection 38 with a bracket 39, secured to the rear intermediate strut 17, as illustrated in Figure 3. The front end of the section 36 is downturned, as shown at 40 and terminates in a horizontal ear 41 resting upon and bolted, as shown at 42, or otherwise secured, to the section 37. Said section 37 underlies the front strut 15, and has an upturned rear end 43 in rear of said strut which upturned end is bolted or otherwise secured, as shown at 44 to the section 36. The draft member or tongue thus embraces the strut 15. The section 36 carries a foot piece 45, in which is mounted the standard 46 of a seat 47 and a foot piece 48 for the operator is carried by standards 49 secured to the front strut 15 on opposite sides of the tongue. The lateral movement of the tongue with respect to the frame of the tool, is governed by cable members, preferably in the form of chains 50 secured to the tongue section 37 and connected to the front ends of the side members 14. This latter connection is preferably to vertical plates 51 bolted, as shown at 52 to the frame members 14 and shown in detail in Figure 6.

Associated with the above described tool is the second tool 13. The specific structure of this latter tool 13 is made the subject-matter of another application, Serial No. 617,123 filed simultaneously herewith. It is therefore unnecessary to go into detail regarding the same in this application. Suffice it to state it consists of a frame 67 carrying spring harrow teeth 68 and other suitable instrumentalities, as for example, clearers 69. This second tool is connected to the first tool by crossed cables in the form of chains 70 connected at the front corner 71 of the rear frame, and to the rear corners 72 of the front frame. These connections are preferably of the same character as that disclosed in Figure 6.

With this construction, when the apparatus is moved along the ground to be treated, obviously the disks of the first implement will cut or score and agitate the surface and will be followed by the spring teeth which will further prepare and agitate the ground, leaving it in smooth condition. The front frame being flexible, and the mountings of the crossed shafts allowing this flexing movement, the apparatus will not only conform to the unevenness of the surface, but turns can be made without creating an abnormal draft on the animals or tractor and without creating undue strain on the parts. The structure is obviously relatively simple and the parts are durable while a maximum of work can be accomplished with a minimum amount of time and power and with relative ease of manipulation.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In an agricultural tool, the combination with a frame, comprising side members and cross struts pivoted thereto, of brackets depending from the side members, boxes pivoted on upright axes in the brackets, cross shafts having their ends in the boxes, and disks on the shafts.

2. In an agricultural tool, the combination with a frame, comprising side members and cross struts pivoted thereto, of brackets depending from the side members, boxes pivoted on upright axes in the brackets, cross shafts that are angular in cross section and have cylindrical ends journaled in the boxes, disks located side by side on the shafts and spacing elements interposed between the disks.

3. In an agricultural tool, the combination with a frame, comprising side members and cross struts pivoted thereto, of depending brackets secured to the side members and comprising sections fastened together and having inset upper and lower ears, a box pivoted to and between the ears of each bracket, cross shafts journaled in the boxes, and disks located on the shafts.

4. In an agricultural tool, the combination with a frame, comprising side members and cross struts pivoted to the side members, of cross shafts having pivotal mountings on the side members below the cross struts, disks on the shafts, and cleaners for the disks depending from the cross struts and extending between said disks.

5. In an agricultural tool, the combination with a frame, comprising side members and cross struts pivoted to the side members, of brackets depending from the side members in line with the cross struts, boxes pivotally mounted in the brackets, cross shafts journaled in the boxes, disks on the shafts, and cleaners for the disks depending from the cross struts.

6. In an agricultural tool, the combination with a frame, comprising side members and cross struts pivoted to the side members, of earth agitating implements carried by the frame, a draft member pivoted to one of the cross struts in rear of the front end of the frame, said draft member having sections extending both above and below one of the struts in front of its pivotal connection, and cable connections between the front ends of the side members and the draft member.

7. In an agricultural tool, the combination with a frame, comprising side members, front and rear and intermediate cross struts pivoted to the side members, brackets depending from the side members below the intermediate struts, boxes pivotally mounted in the brackets, cross shafts journaled in the boxes, disks on the shafts, cleaner plates depending from the intermediate struts and slotted to receive the disks, a draft member pivoted to one of the intermediate struts and having sections embracing the front strut, and cables connected to the front ends of the side members and to the draft member in front of the frame.

In testimony whereof, I affix my signature.

WASHINGTON J. ENGLE.